(12) United States Patent
Gao et al.

(10) Patent No.: US 12,020,461 B2
(45) Date of Patent: Jun. 25, 2024

(54) METHOD AND APPARATUS FOR Haar-BASED POINT CLOUD CODING

(71) Applicant: TENCENT AMERICA LLC, Palo Alto, CA (US)

(72) Inventors: Wen Gao, West Windsor, NJ (US); Xiang Zhang, Sunnyvale, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 385 days.

(21) Appl. No.: 17/446,263

(22) Filed: Aug. 27, 2021

(65) Prior Publication Data

US 2022/0292730 A1    Sep. 15, 2022

Related U.S. Application Data

(60) Provisional application No. 63/159,409, filed on Mar. 10, 2021.

(51) Int. Cl.
*G06T 9/40* (2006.01)
*H04N 19/60* (2014.01)

(52) U.S. Cl.
CPC ............... *G06T 9/40* (2013.01); *H04N 19/60* (2014.11); *G06T 2210/56* (2013.01)

(58) Field of Classification Search
None
See application file for complete search history.

(56) References Cited

U.S. PATENT DOCUMENTS

| 2015/0382010 A1* | 12/2015 | Rapaka | H04N 19/139 |
| | | | 375/240.16 |
| 2017/0188026 A1* | 6/2017 | Wu | H04N 19/184 |

(Continued)

FOREIGN PATENT DOCUMENTS

| CA | 3 126 760 A1 | 8/2020 |
| EP | 3308540 B1 | 4/2020 |
| WO | 2020162495 A | 8/2020 |

OTHER PUBLICATIONS

International Search Report and Written Opinion issued Dec. 20, 2021 in application No. PCT/US 21/49519.

(Continued)

*Primary Examiner* — Xiaolan Xu
(74) *Attorney, Agent, or Firm* — ARENTFOX SCHIFF LLP

(57) ABSTRACT

In a method of point cloud attribute decoding in a point cloud decoder, a sorting method of a set of points of a point is determined. A quantization parameter for quantizing transform coefficients of a Haar-based attribute coding of the point cloud is determined based on first signaling information in a coded bitstream of the point cloud. The Haar-based attribute coding is configured to perform point cloud compression on the set of points of the point cloud based on a Haar transform. An entropy decoding method for decoding the quantized transform coefficients is determined according to the quantization parameter that is determined based on the first signaling information. The quantized transform coefficients are further determined based on the entropy decoding method. Attributes of the point cloud are reconstructed based on the determined sorting method and the determined quantized transform coefficients.

20 Claims, 12 Drawing Sheets

(56) References Cited

U.S. PATENT DOCUMENTS

| | | | |
|---|---|---|---|
| 2017/0347100 A1 | 11/2017 | Chou et al. | |
| 2017/0347122 A1 | 11/2017 | Chou et al. | |
| 2018/0288415 A1* | 10/2018 | Li | H04N 19/157 |
| 2021/0368186 A1* | 11/2021 | Sugio | H04N 19/46 |
| 2022/0159249 A1* | 5/2022 | Taquet | H04N 19/70 |
| 2022/0377327 A1* | 11/2022 | Park | H04N 19/167 |
| 2023/0290007 A1* | 9/2023 | Yang | H04N 19/597 |
| | | | 382/233 |

OTHER PUBLICATIONS

Sandri, G. et al., "Comments on 'Compression of 30 Point Clouds Using a Region-Adaptive Hierarchical Transform", May 23, 2018 [retrieved on Nov. 4, 2021]. Retrieved from the Internet: <https://arxiv.org/pdf/1805.09146.pdf>.

Krivokuca, M. et al., "A Volumetric Approach to Point Cloud Compression", Sep. 30, 2018 [retrieved on Nov. 4, 2021]. Retrieved from the Internet: <https://arxiv.org/pdf/1810.00484.pdf>.

Mekuria, et al., "Requirements for Point Cloud Compression", International Organisation for Standardisation Organisation Internationale de Normalisation ISO/IEC JTC1/SC29/WG11 Coding of Moving Pictures and Audio, ISO/IEC JTC1/SC29/WG11 MPEG2016/n16330, Feb. 2016, Geneva, CH.

Tulvan, et al., "Use Cases for Point Cloud Compression (PCC)", International Organisation for Standardisation Organisation Internationale de Normalisation ISO/IEC JTC1/SC29/WG11 Coding of Moving Pictures and Audio, ISO/IEC JTC1/SC29/WG11 MPEG2015/ N16331, Jun. 2016, Geneva, CH.

"Information technology—MPEG-I (Coded Representation of Immersive Media)—Part 9: Geometry-based Point Cloud Compression", ISO/IEC 23090-9:2019(E), ISO/IEC JTC 1/SC 29/WG 11.

"G-PCC codec description v5", International Organisation for Standardisation Organisation Internationale de Normalisation ISO/IEC JTC1/SC29/WG11 Coding of Moving Pictures and Audio, ISO/IEC JTC1/SC29/WG11 N18891, Oct. 2019, Geneva, CH.

Supplementary European Search Report mailed Aug. 21, 2023 in Application No. 21923608.0, pp. 1-15.

Korean Office Action issued Aug. 21, 2023 in Application No. 10-2022-7025354, pp. 1-14.

Anonymous: "Space-filling curve—Wikipedia", Jan. 9, 2021, pp. 1-6.

* cited by examiner

METHOD AND APPARATUS FOR Haar-BASED POINT CLOUD CODING

INCORPORATION BY REFERENCE

This present application claims the benefit of priority to U.S. Provisional Application No. 63/159,409, "ON HAAR-BASED ATTRIBUTE CODING FOR POINT CLOUDS" filed on Mar. 10, 2021, which is incorporated by reference herein in its entirety.

TECHNICAL FIELD

The present disclosure describes embodiments generally related to point cloud coding, including improvements on Haar-based attribute coding for point clouds.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. Point clouds can be used as a 3D representation of the world. A point cloud is a set of points in a 3D space, each with associated attributes, e.g. color, material properties, texture information, intensity attributes, reflectivity attributes, motion related attributes, modality attributes, and/or various other attributes. Such point clouds may include large amounts of data and may be costly and time-consuming to store and transmit.

SUMMARY

Aspects of the disclosure provide methods and apparatuses for point cloud compression and decompression. According to an aspect of the disclosure, a method of point cloud attribute decoding in a point cloud decoder is provided. In the method, a sorting method of a set of points of a point cloud can be determined. A quantization parameter for quantizing transform coefficients of a Haar-based attribute coding of the point cloud can be determined based on first signaling information in a coded bitstream of the point cloud. The Haar-based attribute coding can be configured to perform point cloud compression on the set of points of the point cloud based on a Haar transform. An entropy decoding method for decoding the quantized transform coefficients can be determined according to the quantization parameter that is determined based on the first signaling information. The quantized transform coefficients can be further determined based on the entropy decoding method. Attributes of the point cloud can be reconstructed based on the determined sorting method and the determined quantized transform coefficients.

In an example, the sorting method can be determined based on second signaling information in the coded bitstream of the point cloud. The sorting method can be a Morton sorting based on the second signaling information being equal to a first value. In another example, the sorting method can be determined to be a Hilbert sorting based on the second signaling information being equal to a second value.

In some embodiments, the first signaling information can be set based on one of the quantization parameter, an application of the point cloud, and a characteristic of the point cloud.

In the method, when the entropy decoding method is an exponential Golomb coding, an order k of the exponential Golomb coding can be determined based on third signaling information in the coded bitstream, where the third signaling information is indicative of the order k of the exponential Golomb coding.

In the method, when the entropy decoding method is an exponential Golomb coding, an order k of the exponential Golomb coding can be determined based on the quantization parameter. Thus, the order $$k = \max\left(0, \max\_k - \left\lfloor \frac{\text{trans\_coeff\_qp}}{s} \right\rfloor\right).$$

The max_k is a maximum order for the exponential Golomb coding for decoding the quantized transform coefficients, the trans_coeff_qp is a value of the quantization parameter, and the s is a positive integer that is equal to one of six and eight.

In some embodiments, in order to determine the quantized transform coefficients based on the entropy decoding method, absolute values of the quantized transform coefficients minus a threshold value can be decoded based on the exponential Golomb coding and the determined order k of the exponential Golomb coding. The threshold value can be equal to one of one, two, and three.

In some embodiments, in order to determine the quantized transform coefficients based on the entropy decoding method, a first quantized transform coefficient x of the quantized transform coefficients can be decoded. The first quantized transform coefficient x can be coded by the exponential Golomb coding such that a first part $$\left\lfloor \frac{x}{2^k} \right\rfloor$$

is coded using the exponential Golomb coding with the order k equal to zero, and a second part (x modulo $2^k$) is coded in a binary form.

In the method, the set of points of the point cloud can be sorted based on the determined sorting method. The set of sorted points of the point cloud can further be partitioned into a plurality of segments based on a partition size indicated by partitioning signaling information in the coded bitstream. Each of the plurality of segments of the point cloud can be reconstructed respectively based on the determined quantized transform coefficients.

In some embodiments, a number of the plurality of segments can be equal to [N/M], where the N can be a number of the set of points in the point cloud, and the M can be a positive integer. The [N/M] can be an integer that is greater than or equal to N/M.

In the method, in order to reconstruct the point cloud, a scaling factor of ½ of a Haar transform matrix can be determined that is associated with the Haar-based attribute coding. An inverse quantization operation can be performed on the quantized transform coefficients to obtain transform coefficients based on the Haar-based attribute coding. An inverse transform operation can be performed on the point cloud based on the Haar transform matrix and the transform coefficients to obtain attribute residuals. The attributes of the point cloud can further be reconstructed based on the attribute residuals and predictive attributes of the point cloud obtained through the Haar-based attribute coding.

The apparatus for processing the point cloud data is configured to perform the methods above. For example, the apparatus for processing point cloud data includes receiving circuitry and processing circuitry that are configured to perform one or more of the methods described above. For example, the apparatus can include processing circuitry that is configured to determine a sorting method of a set of points of a point cloud based on first signaling information in a coded bitstream of the point cloud. The processing circuitry can also be configured to determine a quantization parameter for quantizing transform coefficients of a Haar-based attribute coding of the point cloud based on second signaling information in the coded bitstream of the point cloud. The processing circuitry can be configured to determine an entropy decoding method for decoding the quantized transform coefficients according to the quantization parameter that is determined based on the second signaling information. The processing circuitry can further be configured to determine the quantized transform coefficients based on the entropy decoding method. The processing circuitry can be configured to reconstruct attributes of the point cloud based on the determined sorting method and the determined quantized transform coefficients.

In some embodiments, the processing circuitry can further be configured to sort the set of points of the point cloud based on the determined sorting method. The processing circuitry can then be configured to partition the set of sorted points of the point cloud into a plurality of segments based on a partition size indicated by partitioning signaling information in the coded bitstream. Subsequently, the processing circuitry can be configured to reconstruct each of the plurality of segments of the point cloud based on the determined quantized transform coefficients. In some embodiments, a number of the plurality of segments is equal to [N/M]. The N can be a number of the set of points in the point cloud, and the M can be a positive integer. The [N/M] can be an integer that is greater than or equal to N/M.

According to an aspect of the disclosure, a non-transitory computer-readable storage medium is provided. The non-transitory computer-readable storage medium stores instructions which when executed by at least one processor cause the at least one processor to perform one or more of the methods described above. For example, in the method, a sorting method of a set of points of a point cloud can be determined based on first signaling information in a coded bitstream of the point cloud. A quantization parameter for quantizing transform coefficients of a Haar-based attribute coding of the point cloud can be determined based on second signaling information in the coded bitstream of the point cloud. An entropy decoding method for decoding the quantized transform coefficients can be determined according to the quantization parameter that is determined based on the second signaling information. The quantized transform coefficients can be further determined based on the entropy decoding method. Attributes of the point cloud can be reconstructed based on the determined sorting method and the determined quantized transform coefficients.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Point clouds have become more widely used in recent years. For example, a point cloud can be used in autonomous driving vehicles for object detection and localization. A point cloud can also be used in geographic information systems (GIS) for mapping, and used in cultural heritage to visualize and archive cultural heritage objects and collections, etc.

A point cloud can contain a set of high dimensional points, typically in three dimensions (3D). Each of the high dimensional points can include 3D position information and additional attributes such as color, reflectance, etc. The high dimensional points can be captured using multiple cameras and depth sensors, or Lidar in various setups, and may be formed of thousands or billions of points to realistically represent the original scenes.

Thus, compression technologies are needed to reduce the amount of data required to represent a point cloud for faster transmission or reduction of storage. ISO/IEC MPEG (JTC 1/SC 29/WG 11) has created an ad-hoc group (MPEG-PCC) to standardize the compression techniques for static or dynamic point clouds. In addition, Audio Video coding standards workgroup of China also created an ad-hoc group (AVS-PCC) to standardize the compression of point clouds.

Figure 1:
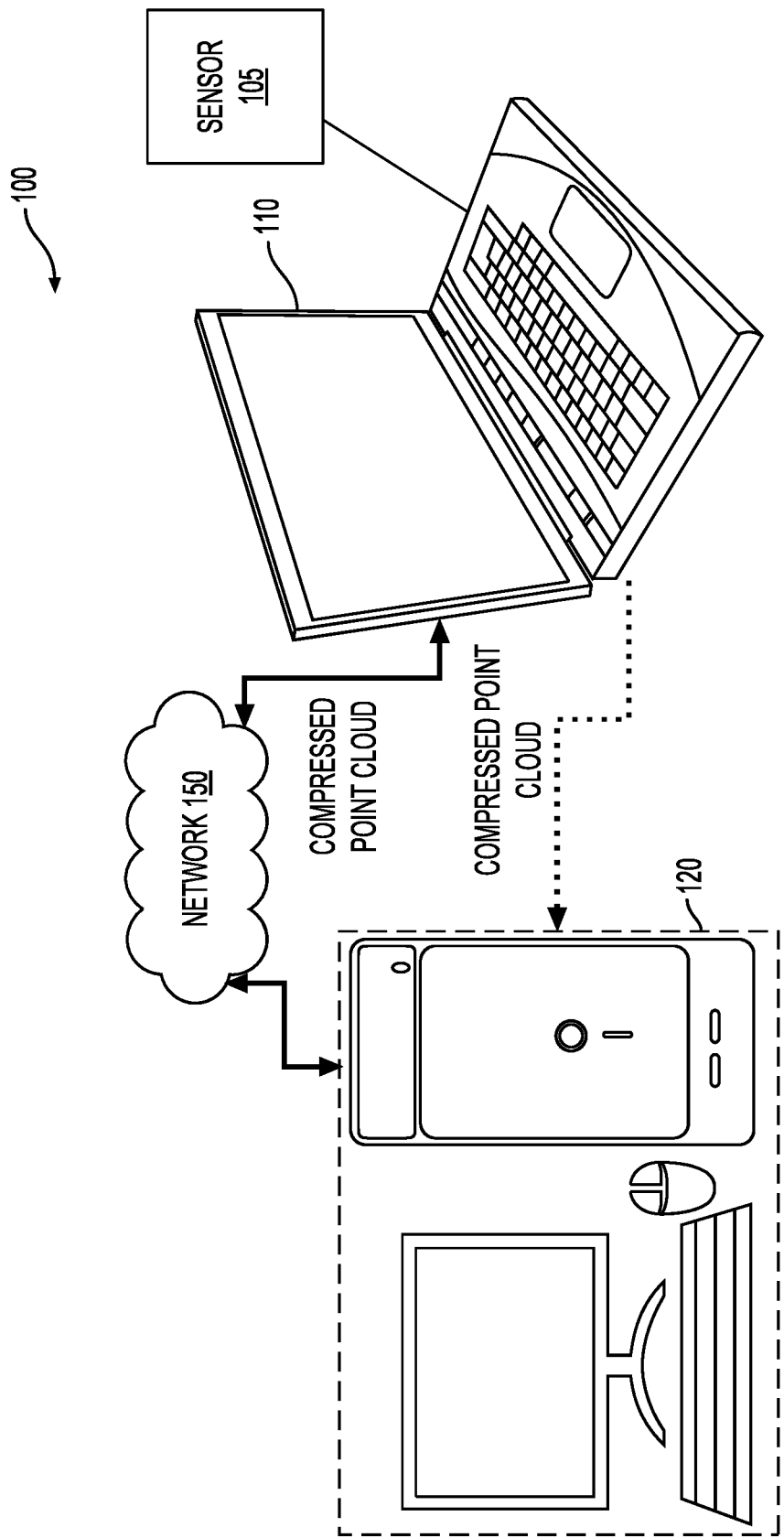
FIG. 1 is a schematic illustration of a simplified block diagram of a communication system in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit a compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
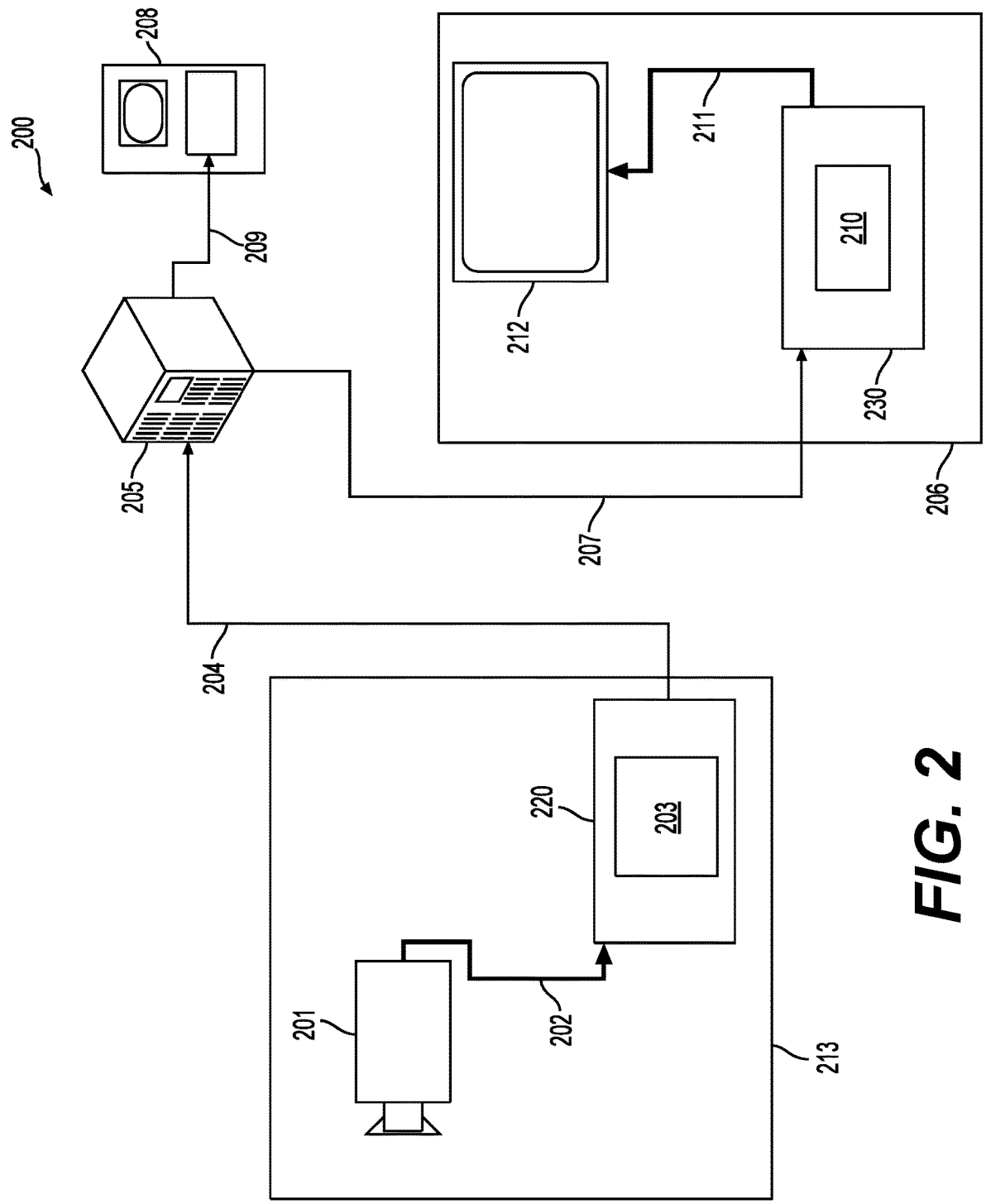
FIG. 2 is a schematic illustration of a simplified block diagram of a streaming system in accordance with an embodiment.

FIG. 2 illustrates a simplified block diagram of a streaming system (200) in accordance with an embodiment. The FIG. 2 example is an application for the disclosed subject matter for a point cloud. The disclosed subject matter can be equally applicable to other point cloud enabled applications, such as, a 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
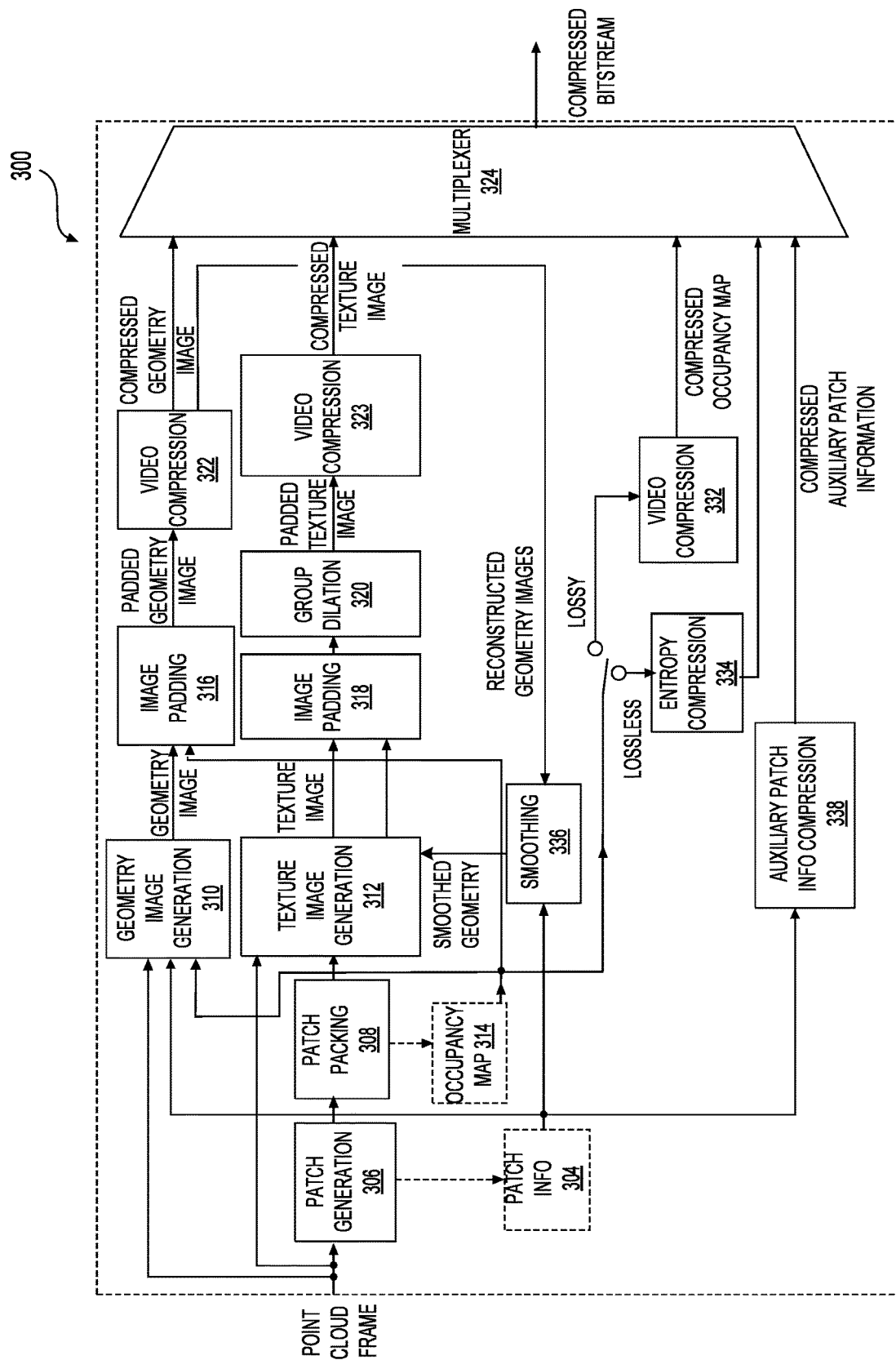
FIG. 3 shows a block diagram of an encoder for encoding point cloud frames, according to some embodiments.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into an image-based representation along with some meta data (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

A patch generally may refer to a contiguous subset of the surface described by the point cloud. In an example, a patch includes points with surface normal vectors that deviate from one another less than a threshold amount. The patch generation module (306) segments a point cloud into a set of patches, which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

The patch info module (304) can collect the patch information that indicates sizes and shapes of the patches. In some examples, the patch information can be packed into an image frame and then encoded by the auxiliary patch info compression module (338) to generate the compressed auxiliary patch information.

The patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, a geometry image is represented by a monochromatic frame of W×H in YUV420-8bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate and does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g., geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, and/or the compressed auxiliary patch information into a compressed bitstream.

Figure 4:
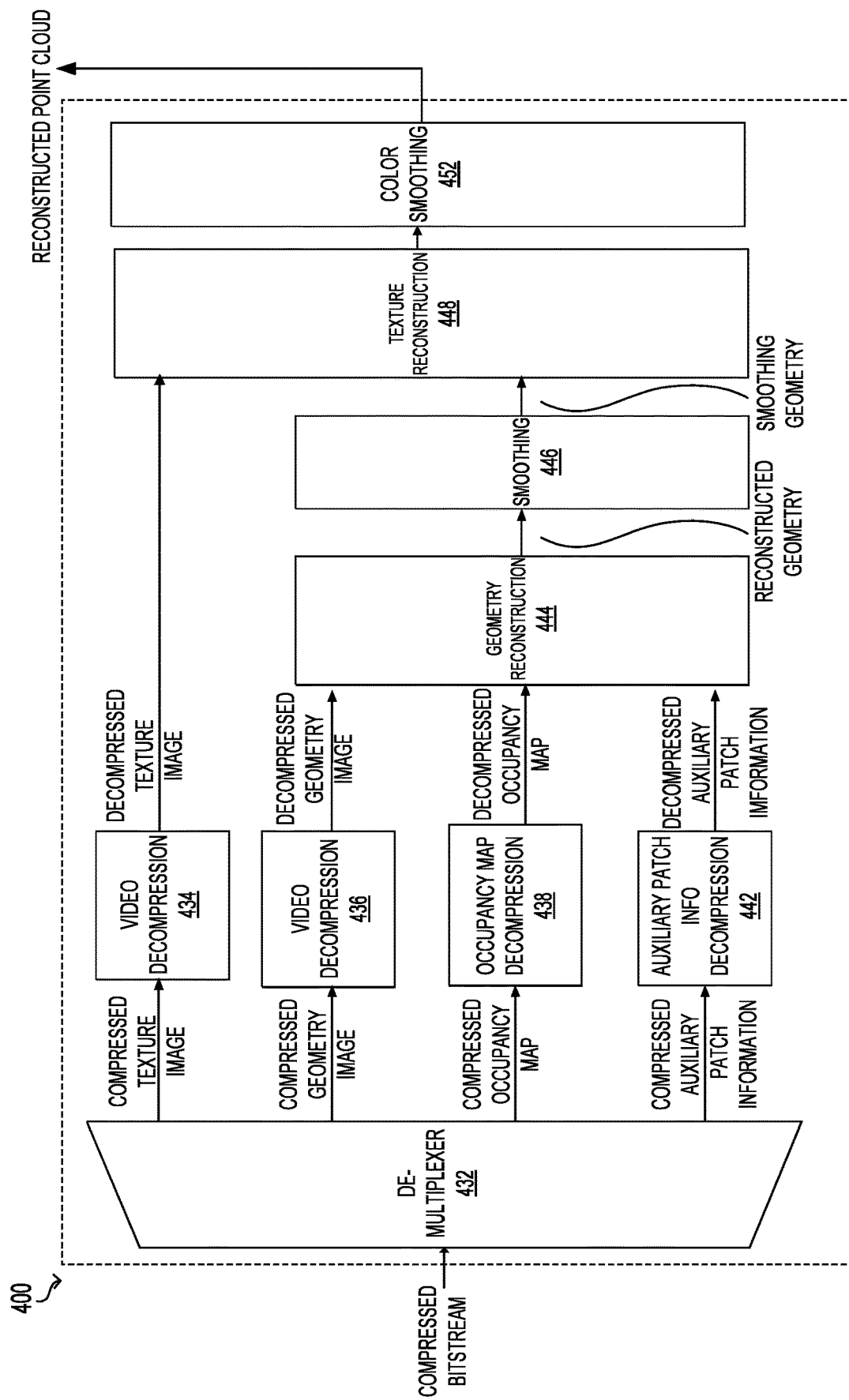
FIG. 4 shows a block diagram of a decoder for decoding a compressed bitstream corresponding to point cloud frames according to some embodiments.

FIG. 4 shows a block diagram of a V-PCC decoder (400) for decoding a compressed bitstream corresponding to point cloud frames, according to some embodiments. In some embodiments, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates a reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into a compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
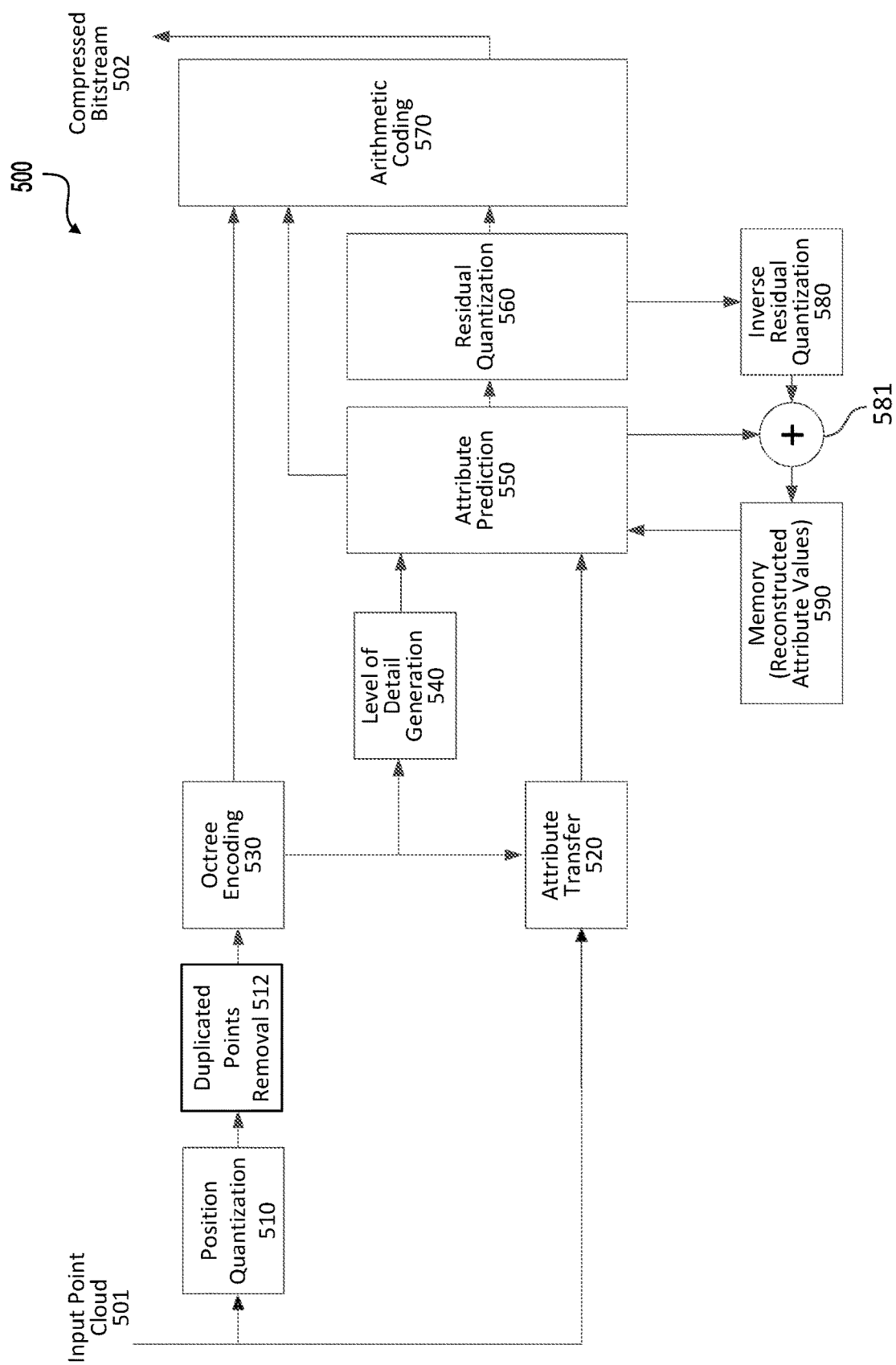
FIG. 5 shows a block diagram of an encoder for encoding point cloud frames, according to some embodiments.

FIG. 5 shows a block diagram of a G-PPC encoder (500) in accordance with some embodiments. The encoder (500) can be configured to receive point cloud data and compress the point cloud data to generate a bit stream carrying compressed point cloud data. In an embodiment, the encoder (500) can include a position quantization module (510), a duplicated points removal module (512), an octree encoding module (530), an attribute transfer module (520), a level of detail (LOD) generation module (540), an attribute prediction module (550), a residual quantization module (560), an arithmetic coding module (570), an inverse residual quantization module (580), an addition module (581), and a memory (590) to store reconstructed attribute values.

As shown, an input point cloud (501) can be received at the encoder (500). Positions (e.g., 3D coordinates) of the point cloud (501) are provided to the quantization module (510). The quantization module (510) is configured to quantize the coordinates to generate quantized positions. The duplicated points removal module (512) is configured to receive the quantized positions and perform a filter process to identify and remove duplicated points. The octree encoding module (530) is configured to receive filtered positions from the duplicated points removal module (512), and perform an octree-based encoding process to generate a sequence of occupancy codes that describe a 3D grid of voxels. The occupancy codes are provided to the arithmetic coding module (570).

The attribute transfer module (520) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (530). The attributes after the transfer operations are provided to the attribute prediction module (550). The LOD generation module (540) is configured to operate on the re-ordered points output from the octree encoding module (530), and re-organize the points into different LODs. LOD information is supplied to the attribute prediction module (550).

The attribute prediction module (550) processes the points according to an LOD-based order indicated by the LOD information from the LOD generation module (540). The attribute prediction module (550) generates an attribute prediction for a current point based on reconstructed attributes of a set of neighboring points of the current point stored in the memory (590). Prediction residuals can subsequently be obtained based on original attribute values received from the attribute transfer module (520) and locally generated attribute predictions. When candidate indices are used in the respective attribute prediction process, an index corresponding to a selected prediction candidate may be provided to the arithmetic coding module (570).

The residual quantization module (560) is configured to receive the prediction residuals from the attribute prediction module (550), and perform quantization to generate quantized residuals. The quantized residuals are provided to the arithmetic coding module (570).

The inverse residual quantization module (580) is configured to receive the quantized residuals from the residual quantization module (560), and generate reconstructed prediction residuals by performing an inverse of the quantization operations performed at the residual quantization module (560). The addition module (581) is configured to receive the reconstructed prediction residuals from the inverse residual quantization module (580), and the respective attribute predictions from the attribute prediction module (550). By combining the reconstructed prediction residuals and the attribute predictions, the reconstructed attribute values are generated and stored to the memory (590).

The arithmetic coding module (570) is configured to receive the occupancy codes, the candidate indices (if used), the quantized residuals (if generated), and other information, and perform entropy encoding to further compress the received values or information. As a result, a compressed bitstream (502) carrying the compressed information can be generated. The bitstream (502) may be transmitted, or otherwise provided, to a decoder that decodes the compressed bitstream, or may be stored in a storage device.

Figure 6:
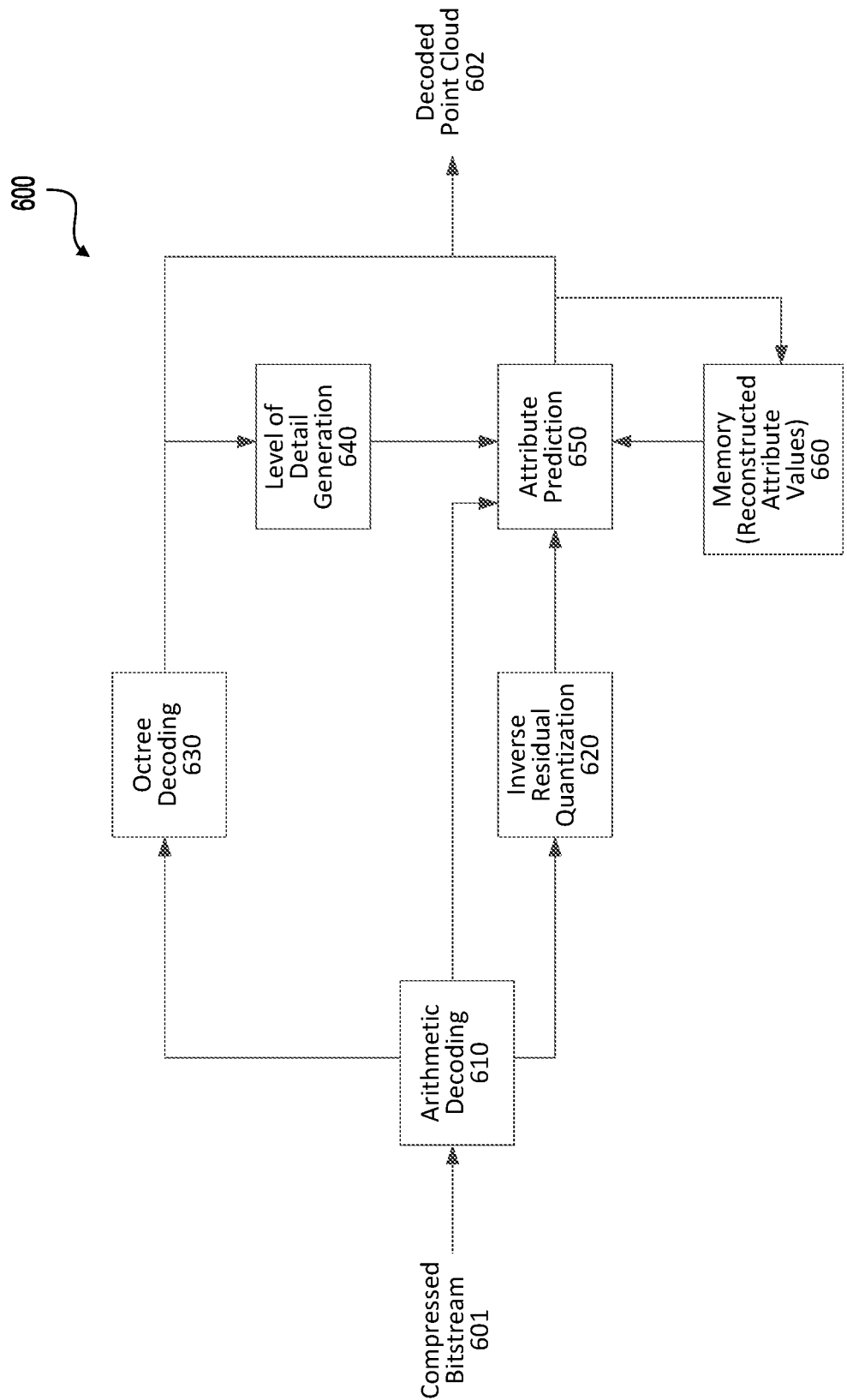
FIG. 6 shows a block diagram of a decoder for decoding a compressed bitstream corresponding to point cloud frames according to some embodiments.

FIG. 6 shows a block diagram of a G-PCC decoder (600) in accordance with an embodiment. The decoder (600) can be configured to receive a compressed bitstream and perform point cloud data decompression to decompress the bitstream to generate decoded point cloud data. In an embodiment, the decoder (600) can include an arithmetic decoding module (610), an inverse residual quantization module (620), an octree decoding module (630), an LOD generation module (640), an attribute prediction module (650), and a memory (660) to store reconstructed attribute values.

As shown, a compressed bitstream (601) can be received at the arithmetic decoding module (610). The arithmetic decoding module (610) is configured to decode the compressed bitstream (601) to obtain quantized residuals (if generated) and occupancy codes of a point cloud. The octree decoding module (630) is configured to determine reconstructed positions of points in the point cloud according to the occupancy codes. The LOD generation module (640) is configured to re-organize the points into different LODs based on the reconstructed positions, and determine an LOD-based order. The inverse residual quantization module (620) is configured to generate reconstructed residuals based on the quantized residuals received from the arithmetic decoding module (610).

The attribute prediction module (650) is configured to perform an attribute prediction process to determine attribute predictions for the points according to the LOD-based order. For example, an attribute prediction of a current point can be determined based on reconstructed attribute values of neighboring points of the current point stored in the memory (660). In some examples, the attribute prediction can be combined with a respective reconstructed residual to generate a reconstructed attribute for the current point.

A sequence of reconstructed attributes generated from the attribute prediction module (650) together with the reconstructed positions generated from the octree decoding module (630) corresponds to a decoded point cloud (602) that is output from the decoder (600) in one example. In addition, the reconstructed attributes are also stored into the memory (660) and can be subsequently used for deriving attribute predictions for subsequent points.

In various embodiments, the encoder (300), the decoder (400), the encoder (500), and/or the decoder (600) can be implemented with hardware, software, or combination thereof. For example, the encoder (300), the decoder (400), the encoder (500), and/or the decoder (600) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (500), and/or the decoder (600) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (500), and/or the decoder (600).

It is noted that the attribute prediction modules (550) and (650) configured to implement the attribute prediction techniques disclosed herein can be included in other decoders or encoders that may have similar or different structures from what is shown in FIG. 5 and FIG. 6. In addition, the encoder (500) and decoder (600) can be included in a same device, or separate devices in various examples.

In a Test Model 13 (TMC13), the geometry information and the associated attributes of the point clouds, such as color or reflectance, can be separately compressed. The geometry information, which is the 3D coordinates of the point clouds, can be coded by an octree-partition with the occupancy information of the point clouds. The attributes can then be compressed based on reconstructed geometry using prediction, lifting, and region adaptive hierarchical transform (RAHT) techniques.

Prediction based attribute coding for a point cloud can be described as follows. For simplicity, one level of detail (LoD) can be assumed in the prediction based attribute coding.

Let $(P_i)_{i=1 \ldots N}$ be a set of positions associated with the points of the point cloud and let $(M_i)_{i=1 \ldots N}$ be Morton codes associated with $(P_i)_{i=1 \ldots N}$. First, the points can be sorted according to the associated Morton codes of the points in an ascending order. Let I be an array of point indexes that is ordered according to the ascending order. The encoder/decoder can compress/decompress the points respectively according to the order defined by I. At each iteration i, a point $P_i$ can be selected. Distances of $P_i$ to s (e.g., s=64) previous points can be analyzed and k (e.g., k=3) nearest neighbors of $P_i$ can be selected to be used for prediction. More precisely, the attribute values $(a_i)_{i \in 1 \ldots N}$ can be predicted by using a linear interpolation process based on the distances of the nearest neighbours of point i. Let $\varkappa_i$ be the set of the k-nearest neighbours of the current point i, and let $(\tilde{a}_j)_{j \in \varkappa_i}$ be the decoded/reconstructed attribute values of the set of the k-nearest neighbours and $(\delta_j)_{j \in \varkappa_i}$ the distances of the set of the k-nearest neighbours to the current point i. A predicted attribute value $\hat{a}_i$ can be calculated based on attribute values of the neighbors and the distances of the set of neighbors to the current point according to equation (1) as follows:

$$\hat{a}_i = \text{Round}\left(\sum j \in \aleph_i \frac{\frac{1}{\delta_j^2}}{\sum t \in \aleph_i \frac{1}{\delta_t^2}} \tilde{a}_j\right) \quad \text{Eq. (1)}$$

Prediction based attribute coding in AVS-PCC can be different from that in MPEG. One difference is the sorting order. A Hilbert sorting order can be used for the prediction based attribute coding in AVS-PCC. The coding process of the prediction based attribute coding in AVS-PCC can be shown as follow: First, the Hilbert code of a point in a point cloud can be determined using a look-up table. Then all the points in the point cloud can be sorted using Hilbert code values of the points. Points with smaller Hilbert codes can appear before points with larger Hilbert codes.

Lifting based attribute coding can be built upon the prediction based attribute coding. Compared with the prediction based attribute coding, two addition steps are introduced in the lifting based attribute coding: (a) introduction of an update operator; and (b) use of an adaptive quantization strategy.

Figure 7:
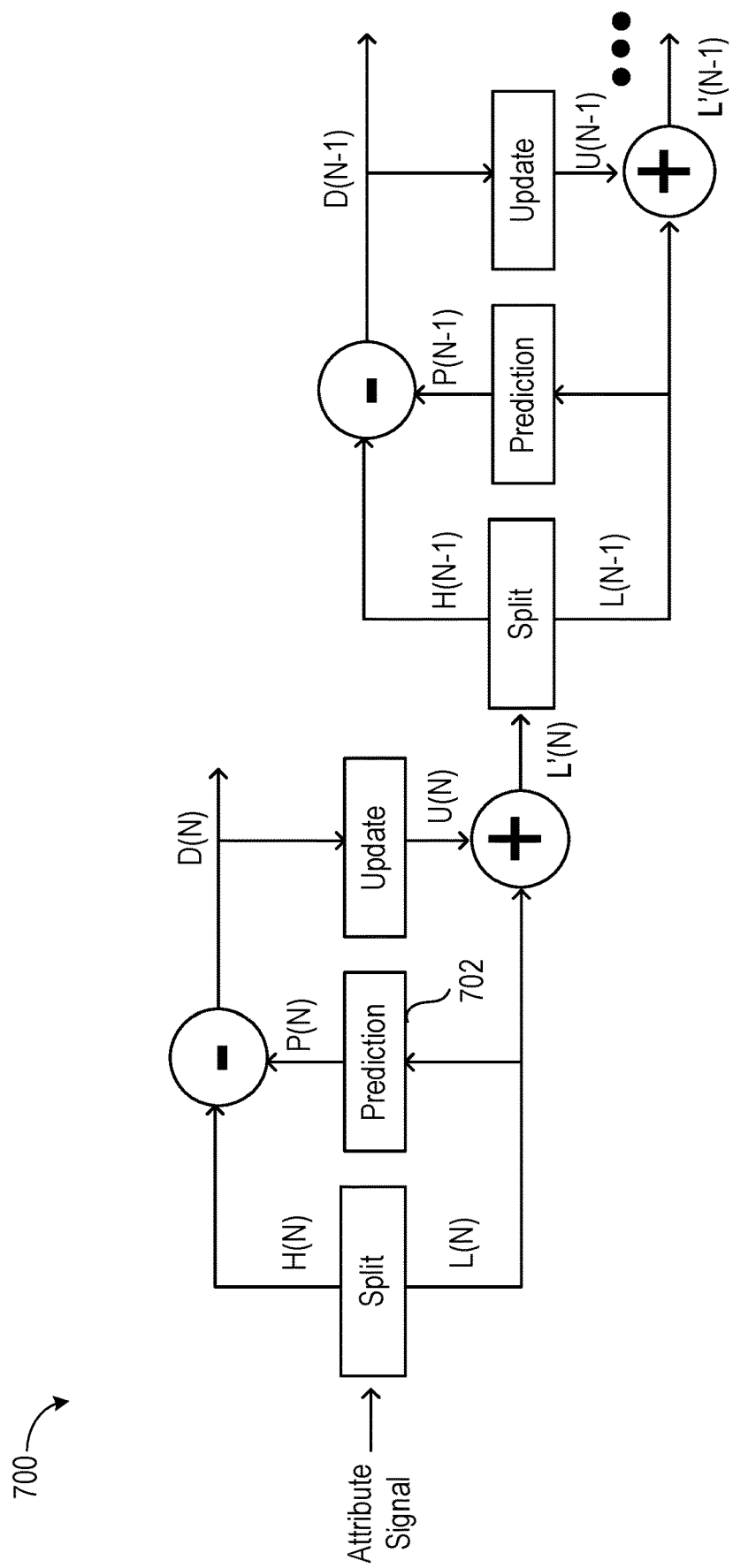
FIG. 7 shows a block diagram of a forward transform in a lifting based attribute coding according to some embodiments.
Figure 8:
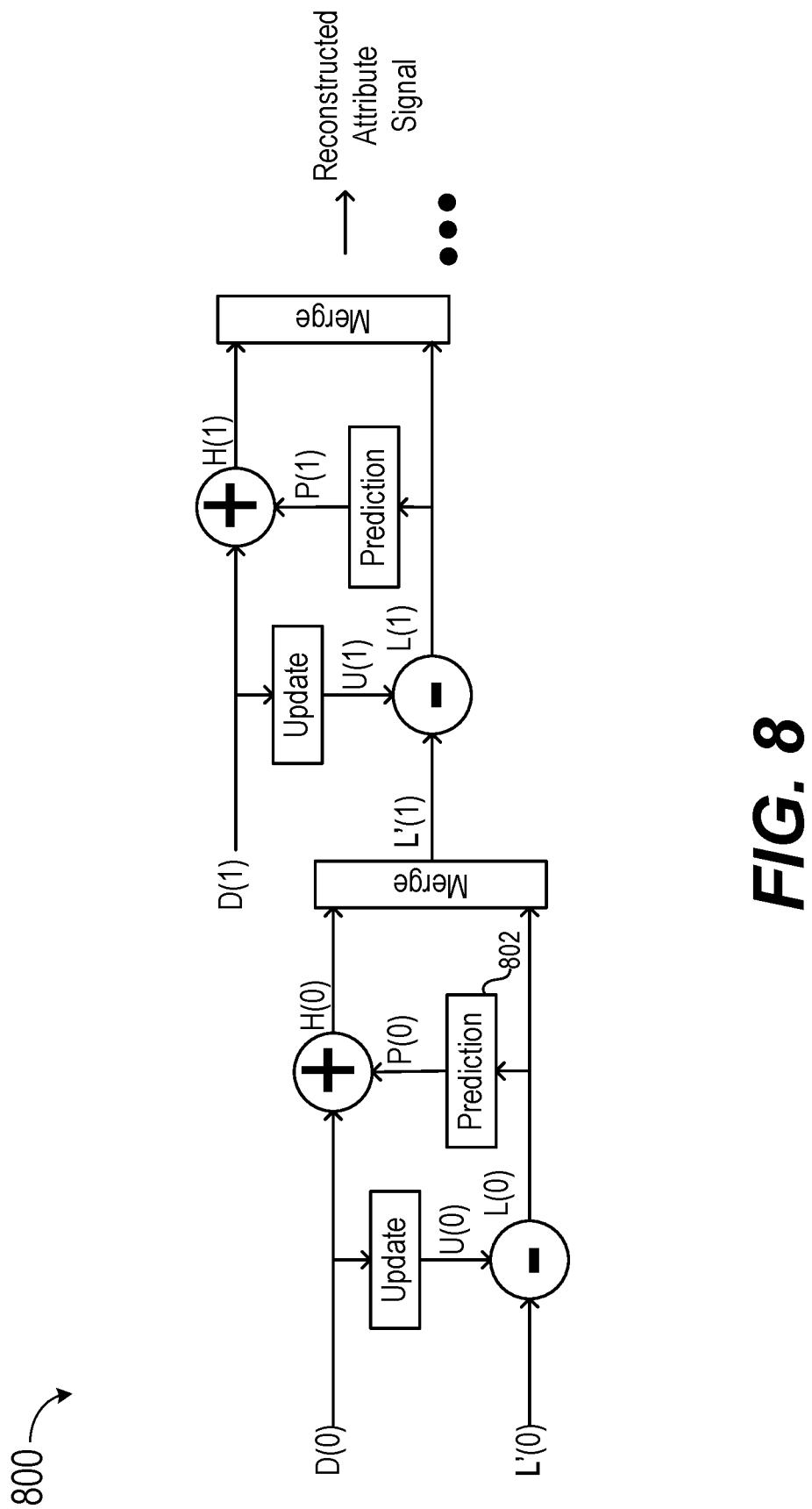
FIG. 8 shows a block diagram of an inverse transform in the lifting based attribute coding according to some embodiments.

For illustration, the operation of the lifting based attribute coding can be shown in FIGS. 7 and 8. FIG. 7 shows a block diagram of a forward transform 700 in the lifting based attribute coding, and FIG. 8 shows a block diagram of an inverse transform 800 in the lifting based attribute coding.

As shown in FIG. 7, an attribute signal at a level N can be split into a high-pass signal H(N) and a low-pass signal L(N). The L(N) can generate a prediction signal P(N) based on a prediction process 702. A difference signal D(N) can be generated based on a difference between H(N) and L(N). The difference signal D(N) can further be updated to generate an updated signal U(N). A sum of the U(N) and the L(N) can generate an updated low-pass signal L'(N). The L'(N) can further be split into a high-pass signal H(N−1) and a low-pass signal L(N−1) at a subsequent level (N−1). The L(N−1) can generate a prediction signal P(N−1) at level N−1. A difference signal D(N−1) at level N−1 can be generated based on a difference between H(N−1) and L(N−1). The difference signal D(N−1) can further be updated to generate an updated signal U(N−1) at level N−1. A sum of the U(N−1) and the L(N−1) can generate an updated low-pass signal L'(N−1) at level N−1.

The difference signal D(N−1) and the updated low-pass signal L'(N−1) can further be decomposed into D(N−2) and L'(N−2). The splitting step can be repeatedly applied until an updated low-pass signal L'(0) of a base layer is obtained.

In FIG. 8, the inverse transform 800 of the lifting based attribute coding is provided. As shown in FIG. 8, a low-pass signal L(0) at level zero can be generated based on a difference of an updated low-pass signal L'(0) and an updated signal U(0). The updated signal U(0) is obtained by updating a difference signal D(0). The L(0) can further generate a prediction signal P(0) based on a prediction process 802. The P(0) is further added with the D(0) to generate a high-pass signal H(0). The H(0) and L(0) can be merged to generate an updated low-pass L'(1) at level one. The merging step can be repeatedly applied until a high-pass signal H(N) and a low-pass signal L(N) are generated at a level N. The H(N) and L(N) can further be merged to form the reconstructed attribute signal.

Figure 9A:
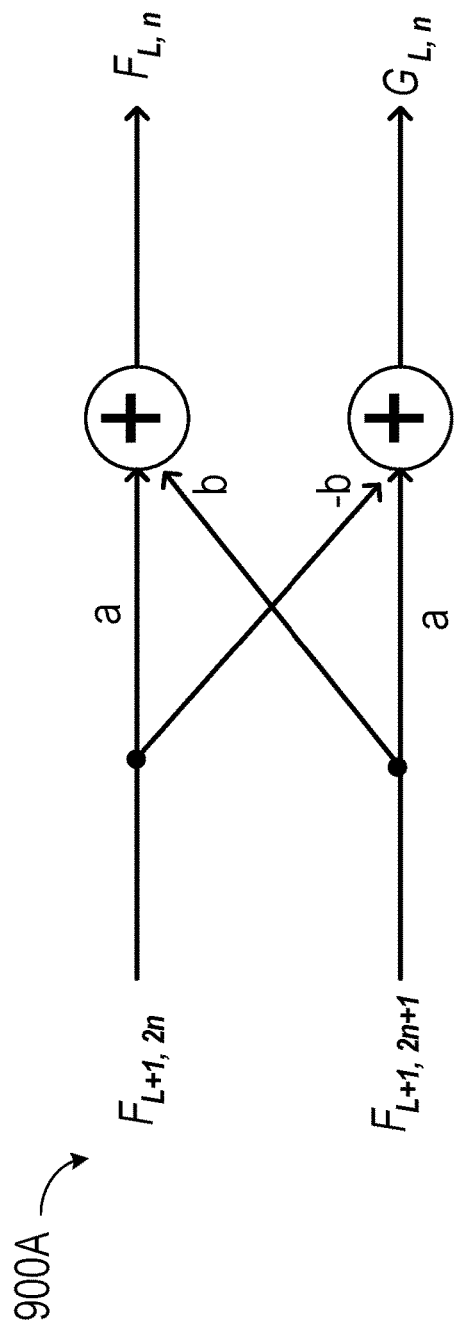
FIG. 9A shows a diagram of a forward transform in a region adaptive hierarchical transform (RAHT) based attribute coding according to some embodiments of the disclosure.
Figure 9B:
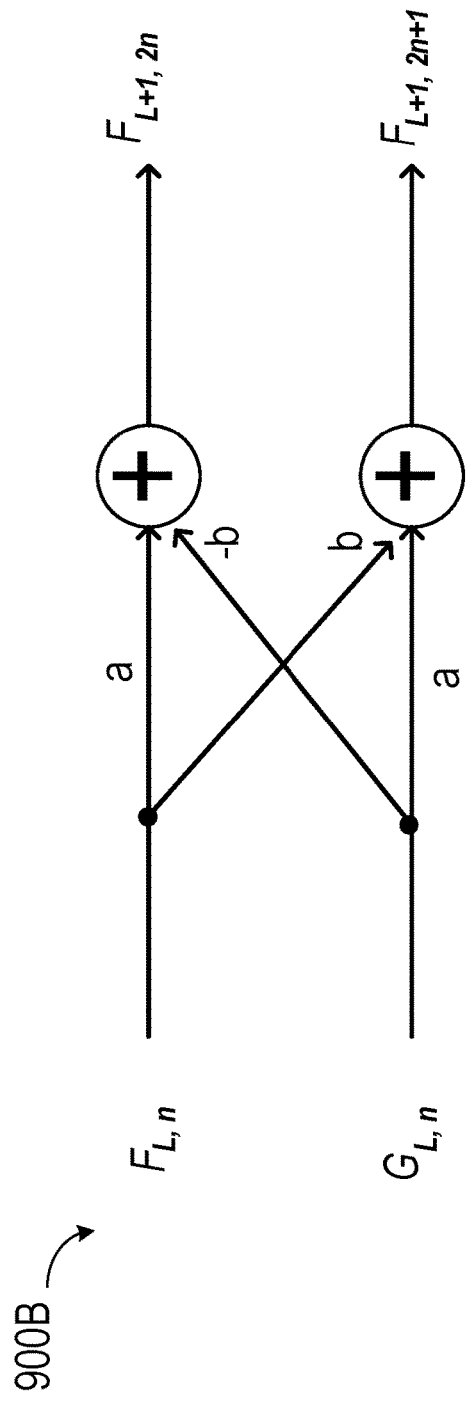
FIG. 9B shows a diagram of an inverse transform in a region adaptive hierarchical transform (RAHT) based attribute coding according to some embodiments of the disclosure.

FIG. 9A illustrates a forward transform 900A for RAHT based attribute coding, and FIG. 9B illustrates a reverse transform 900B for RAHT based attribute coding. In FIGS. 9A and 9B, $$a^2 = \frac{w_0}{w_0 + w_1} \text{ and } b^2 = \frac{w_1}{w_0 + w_1},$$

and $w_0$ is the notation of a weight of the input coefficient $F_{l+1,2n}$ while $w_1$ is the notation of a weight of the input coefficient $F_{l+1,2n+1}$.

Haar based attribute coding can also be introduced in AVS-PCC. The technique of the Haar based attribute coding can be described as follows. The Haar-based attribute coding can be configured to perform point cloud compression on points of a point cloud based on a Haar transform.

In a first step of the Haar based attribute coding, points in a point cloud can be sorted using a Morton order before attribute coding, where points with smaller Morton codes can appear before points with larger Morton codes. The coordinates of the k-th point in a point cloud can be denoted as $(X^k, Y^k, Z^k)$, k=0, ..., N−1, where the $X^k$, $Y^k$, and $Z^k$ can be expressed as three L-bit numbers in Equations (2)-(4):

$$X^k = (x_{L-1}^k x_{L-2}^k \ldots x_1^k x_0^k) \quad \text{Eq. (2)}$$

$$Y^k = (y_{L-1}^k y_{L-2}^k \ldots y_1^k y_0^k) \quad \text{Eq. (3)}$$

$$Z^k = (z_{L-1}^k z_{L-2}^k \ldots z_1^k z_0^k) \quad \text{Eq. (4)}$$

The Morton code of a k-th point can be expressing as a 3L-bit number, which can be shown in equation (5) as follows:

$$M_k = (x_{L-1}^k y_{L-1}^k z_{L-1}^k x_{L-2}^k y_{L-2}^k z_{L-2}^k \ldots x_1^k y_1^k z_1^k x_0^k y_0^k z_0^k) \quad \text{Eq. (5)}$$

The corresponding attributes of the points in Morton order can be denoted as $A_k$, k=0, 1, ..., N−1.

In a second step of the Haar based attribute coding, a Haar transform can be applied to the attributes of a pair of consecutive points in Morton order in equation (6) as follows:

$$\begin{pmatrix} H_{2n} \\ H_{2n+1} \end{pmatrix} = T \begin{pmatrix} A_{2n} \\ A_{2n+1} \end{pmatrix}, \text{ for } n = 0, \ldots, \left\lfloor \frac{N}{2} \right\rfloor - 1 \quad \text{Eq. (6)}$$

where [x] denotes a largest integer that is smaller than or equal to x for x>0 and the Haar transform matrix T can be denoted as follows in equation (7):

$$T = \frac{1}{\sqrt{2}} \begin{pmatrix} 1 & 1 \\ 1 & -1 \end{pmatrix} \quad \text{Eq. (7)}$$

where $H_n$, n=0, 1, ..., $$H_n, n = 0, 1, \ldots, 2 * \left\lfloor \frac{N}{2} \right\rfloor - 1$$

are Haar transform coefficients.

$$\frac{1}{\sqrt{2}}$$

is a scaling factor. If N is odd, the last point $A_{N-1}$ has no point to pair with. The corresponding Haar transform coefficient of the last point $A_{N-1}$ can be denoted as follows in equation (8):

$$H_{N-1} = \sqrt{2} \times A_{N-1} \quad \text{Eq. (8)}$$

The high frequency components, $H_{2n+1}$ for n=0, 1, ..., $$H_{2n+1} \text{ for } n = 0, 1, \ldots, \left\lfloor \frac{N}{2} \right\rfloor - 1,$$

can be grouped to form a part of the final Haar transform coefficients. For the low-frequency components, $H_{2n}$ for n=0, 1, ..., $$n = 0, 1, \ldots, \left\lfloor \frac{N}{2} \right\rfloor - 1$$

and $H_{N-1}$ if N is odd, another round of a Haar transform can be applied to the pairs of consecutive components until only one component is left. Further, all the high frequency components and the last component can be grouped to form the final Haar transform coefficients, which can be denoted as $\overline{H}_n$ for n=0, 1, ..., N−1.

In a third step of the Haar based attribute coding, the transform coefficients can be quantized and the quantized transform coefficients can further be coded.

In a fourth step of the Haar based attribute coding, an inverse Haar transform can be applied on the quantized transform coefficients to obtain the reconstructed attributes. The residual can be computed by subtracting the reconstructed attributes from original attributes.

In a last step of the Haar based attribute coding, the attribute residuals can be quantized, and the quantized attribute residuals can further be coded.

It should be noted that given the quantization step for attribute residual as $Q_{set}$, the quantization step size $Q_{trans}$ for the transform coefficients can be given in equation (9) as follows:

$$\begin{cases} Q_{trans} = Q_{set} \times 16, & \text{if } Q_{set} \leq 8 \\ Q_{trans} = 128, & \text{if } 8 < Q_{set} \leq 128 \\ Q_{trans} = Q_{set}, & \text{if } 128 < Q_{set} \end{cases} \quad \text{Eq. (9)}$$

In addition, the coding method of attribute residual and quantize transform coefficients can be the same. For example, given a value x, the coding method can be described in steps (a)-(e) as following:
 (a) Code a flag indicating whether x equals 0 (flag=1 when x is equal to 0; flag=0 when x is not equal to 0);
 (b) If x is not equal to 0, code the sign of x (sign=0 when x is less than or equal to 0, sign=1 when x is larger than 0);
 (c) Code a flag indicating whether the absolute value of x is equal to 1 (flag=1 when |x| is equal to 1; flag=0 when |x|>1, where |x| denotes the absolute value of x);
 (d) If |x|>1, code a flag indicating whether the absolute value of x is equal to 2 (flag=1 when |x| is equal to 2; flag=0 when |x|>2); and
 (e) If |x|>2, code |x|−3 using 0-th order exponential Golomb code.

Haar based attribute coding adopted in AVS-PCC may have some issues. For example, in the Haar based attribute coding, attributes of the whole point cloud are used to construct multiple layers of Haar transform. For a point cloud with N points, $[\log_2(N)]$ layers of Haar transform have to be applied to obtain all the final transform coefficients, where $[\log_2(N)]$ is a minimum integer that is no less than $\log_2(N)$. Accordingly, a large latency can be resulted in if N is large. In addition, the sorting of points, the quantization scheme, the coding of the quantized transform coefficients, and quantized attribute residuals can be improved as well.

The present disclosure includes methods to improve Haar-based attribute coding.

In order to improve the sorting of the points, in an embodiment, instead of Morton order sorting (also referred to as Morton sorting or Morton order), a different sorting order such as Hilbert sorting (or Hilbert order) can be used to sort the points of a point cloud before Haar-based attribute coding. Since points sorted by Hilbert order can often have a higher correlation with neighboring points, an attribute coding performance gain can be achieved.

In an embodiment, a sorting method flag, such as sort_method, can be used to indicate which sorting method is used in Haar based attribute coding. The sorting method flag can be carried in a high level syntax, such as in a sequence parameter set (SPS), an attribute parameter set (APS), a slice header, etc. As an example, the sorting method flag can be carried in the APS, which can be shown in Table 1.

TABLE 1

Sort method flag carried in attribute parameter set (APS)

| | Descriptor |
|---|---|
| attribute_parameter_set( ) { | |
| ... | ... |
| aps_sort_method | u(1) |
| ... | ... |
| byte_alignment( ) | |
| } | |

As shown in Table 1, the sorting method flag (e.g., aps_sort_method) can specify the sorting method before Haar-based attribute coding. When the sorting method flag (e.g., aps_sort_method) is equal to a first value (e.g., 0), the Morton sorting is indicated to be used. When the sorting method flag (e.g., aps_sort_method) is equal to a second value (e.g., 1), another sorting method such as the Hilbert sorting is indicated to be used. Note that in general, an increasing sorting order is used. However, a decreasing sorting can be used as well. In addition, the sorting methods are not limited to Morton and Hilbert orders, and one or more different sorting methods may be utilized in other embodiments. In another embodiment, Hilbert sorting order is always used, there is no need to add aps_sort_method flag in the attribute parameter set.

In an embodiment, instead of determining the quantization parameter for transform coefficients based on the quantization parameter for attribute residual, the quantization parameter can be specified in a high level syntax, such as a SPS, an APS, a slice header, etc. Accordingly, different quantization parameters for transform coefficients can be set based on different applications (e.g., object detection and localization, mapping, and visualizing and archiving cultural heritage objects) or different characteristics (e.g., geometry information, color, and reflectance) of a point cloud. As an example, the quantization parameter can be carried in the APS, which can be shown in Table 2.

TABLE 2

Syntax showing a quantization parameter carried in APS

| | Descriptor |
|---|---|
| attribute_parameter_set( ) { | |
| ... | ... |
| aps_tran_coeff_qp | ue(v) |
| ... | ... |
| byte_alignment( ) | |
| } | |

As shown in Table 2, a quantization parameter flag (e.g., aps_tran_coeff_qp) can specify the quantization parameter that is used to quantize the transform coefficients. In the encoder side, the quantization parameter can be set based on the quantization parameter for the attribute residual or based on other criterions, for example, applications (e.g., object detection and localization, mapping, and/or visualizing and archiving cultural heritage objects) or characteristics (e.g., geometry information, color, and/or reflectance) of point clouds, etc. Further, the determined quantization parameter can be signaled to the decoder side through the quantization parameter flag (e.g., aps_tran_coeff_qp). In another embodiment, instead of directly sending aps_trans_coeff_qp in the bitstream, the difference between aps_trans_coeff_qp and the qp used to code attribute residues, denoted as aps_trans_qp_delta, can be carried in the bitstream.

It is observed that the characteristic of the quantized transform coefficients can not only depend on the characteristic of the raw (unquantized) transform coefficients but also depend on the quantization parameter. When the quantization parameter is large, the quantized transform coefficients can concentrate more around the zero value and the range of the quantized transform coefficients may be small. However, with a smaller quantization parameter, the quantized transform coefficients tend to spread more in a larger range. Thus, a different coding method can be utilized when the quantization parameter is different.

In the application, an exponential Golomb code can be applied in order to entropy code the quantized transform coefficients. In one embodiment, the order of exponential Golomb code can be specified in a high level syntax such as a SPS, an APS, a slice header, etc., along with the quantization parameter of transform coefficients. As an example, the order of exponent Golomb code can be specified in an APS, which can be shown in Table 3.

TABLE 3

Syntax showing the order of exponent Golomb code in APS

| | Descriptor |
|---|---|
| attribute_parameter_set( ) { | |
| ... | ... |
| aps_tran_coeff_qp | ue(v) |
| aps_trans_coeff_eg_order | |
| ... | ... |
| byte_alignment( ) | |
| } | |

In Table 3, as mentioned above, the quantization parameter flag aps_tran_coeff_qp can specify the quantization parameter used to quantize the transform coefficients. A coding flag (e.g., aps_trans_coeff_eg_order) can specify the order of the exponential Golomb code when an absolute value of a quantized transform coefficient minus a threshold is coded.

The threshold can be 2 or other values, such as 1 or 3, depending on the overall quantized transform coding scheme.

Once the order k of the exponential Golomb code is determined by the coding flag (e.g., aps_trans_coeff_e-g_order), the entropy coding process to code a non-negative integer x using the k-th order exponential Golomb code can be performed as follows: (a) firstly, encode $$\left\lfloor \frac{x}{2^k} \right\rfloor$$

using 0-th order exponential Golomb code; and then (b) encode (x modulo $2^k$) in a binary form, where the x can be a quantized transform coefficient.

In another embodiment, the order k of the exponential Golomb code can be implicitly determined based on the quantization parameter for the transform coefficients, by the principle that a smaller quantization parameter requires a relatively large order. In one embodiment, the order k can be specified in equation (10) as follows:

$$k = \max\left(0, \max\_k - \left\lfloor \frac{\text{trans\_coeff\_qp}}{s} \right\rfloor\right) \qquad \text{Eq. (10)}$$

where max_k is a maximum order for the exponential Golomb code used for coding of quantized transform coefficients, trans_coeff_qp is the value of the quantization parameter used in the quantization of transform coefficients, and s is a positive scalar and is often set to 6 or 8, etc. In some embodiments, when the value of the quantization parameter is equal to zero, a lossless coding can be indicated. When the value of the quantization parameter is increased, the quantization step is increased accordingly. In some embodiments, the value max_k can be set to 2 or 3.

In AVS-PCC, as mentioned above, for a point cloud with N points, $[\log_2(N)]$ layers of Haar transform (or Haar based transform) need to be applied to obtain all the final transform coefficients, which may cause a large latency if N is large.

Figure 10:
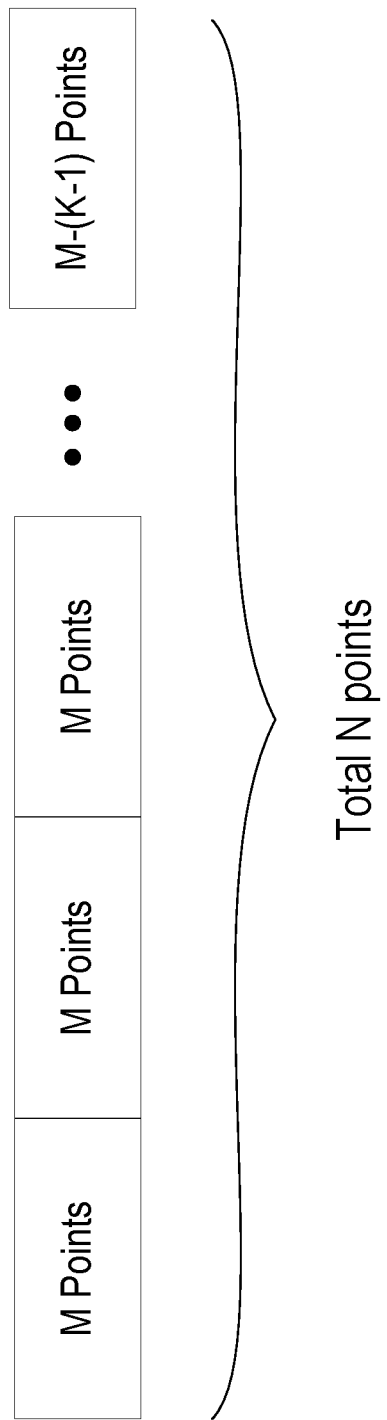
FIG. 10 shows a block diagram of partitioning a point cloud into segments according to some embodiments of the disclosure.

In one embodiment, a point cloud with N points can first be selectively sorted. For example. The point cloud can be selectively sorted using either Morton order or Hilbert order as described before. The sorting orders are not limited to Morton and Hilbert orders, and one or more different sorting orders may be utilized in other embodiments. The sorted N points can further be partitioned into multiple segments. Each of the multiple segments can contain M points except that the last segment may contain less than M points. The number of segments can be expressed as K=[N/M]. The partition can be shown in FIG. 10, for example.

For each segment, a multi-layer Haar transform can be applied. Since the multiple segments do not depend on each other, the multiple segments can be encoded/decoded in parallel. The parallel encoding/decoding can help reduce the encoding/decoding latency. In addition, if each segment is encoded/decoded in a serial fashion, the memory requirement can be greatly reduced.

In AVS-PCC, fixed point operations are utilized both in forward Haar based transform and inverse Haar based transform due to the scaling factor $\sqrt{2}$ or $$\frac{1}{\sqrt{2}}$$

in the transform matrix T that is shown in equation (7).

In an embodiment, the forward Haar based transform and the inverse Haar based transform can be the same, which can be shown in Equation (1). In another embodiment, the scaling factor in the transform matrix of the forward Haar based transform can be one, which can be shown in Equation (11). The scaling factor in the transform matrix of the inverse Haar based transform can be ½, which can be shown in Equation (12).

$$T_{Fwd} = \begin{pmatrix} 1 & 1 \\ 1 & -1 \end{pmatrix} \qquad \text{Eq. (11)}$$

$$T_{Inv} = \frac{1}{2}\begin{pmatrix} 1 & 1 \\ 1 & -1 \end{pmatrix} \qquad \text{Eq. (12)}$$

If N is odd, the last point $A_{N-1}$ has no point to pair with. A corresponding transform coefficient for the last point $A_{N-1}$ can be denoted in Equation (13) as follows:

$$H_{N-1} = 2 \times A_{N-1} \qquad \text{Eq. (13)}$$

Accordingly, during the inverse Haar based transform, the transform coefficient can be divided by 2 for the last point if N is odd. Therefore, only integer operations are required. The transform and inverse transform complexity can be reduced.

It should be noted that the disclosure is not limited to the TMC13 software, MPEG-PCC, or AVS-PCC standard. The current disclosure provides a general solution for most PCC systems. In addition, the methods and the embodiments in the disclosure may be used separately or combined in any order. Further, each of the methods (or embodiments) may be implemented by processing circuitry (e.g., one or more processors or one or more integrated circuits). In one example, the one or more processors can execute a program that is stored in a non-transitory computer-readable medium.

Figure 11:
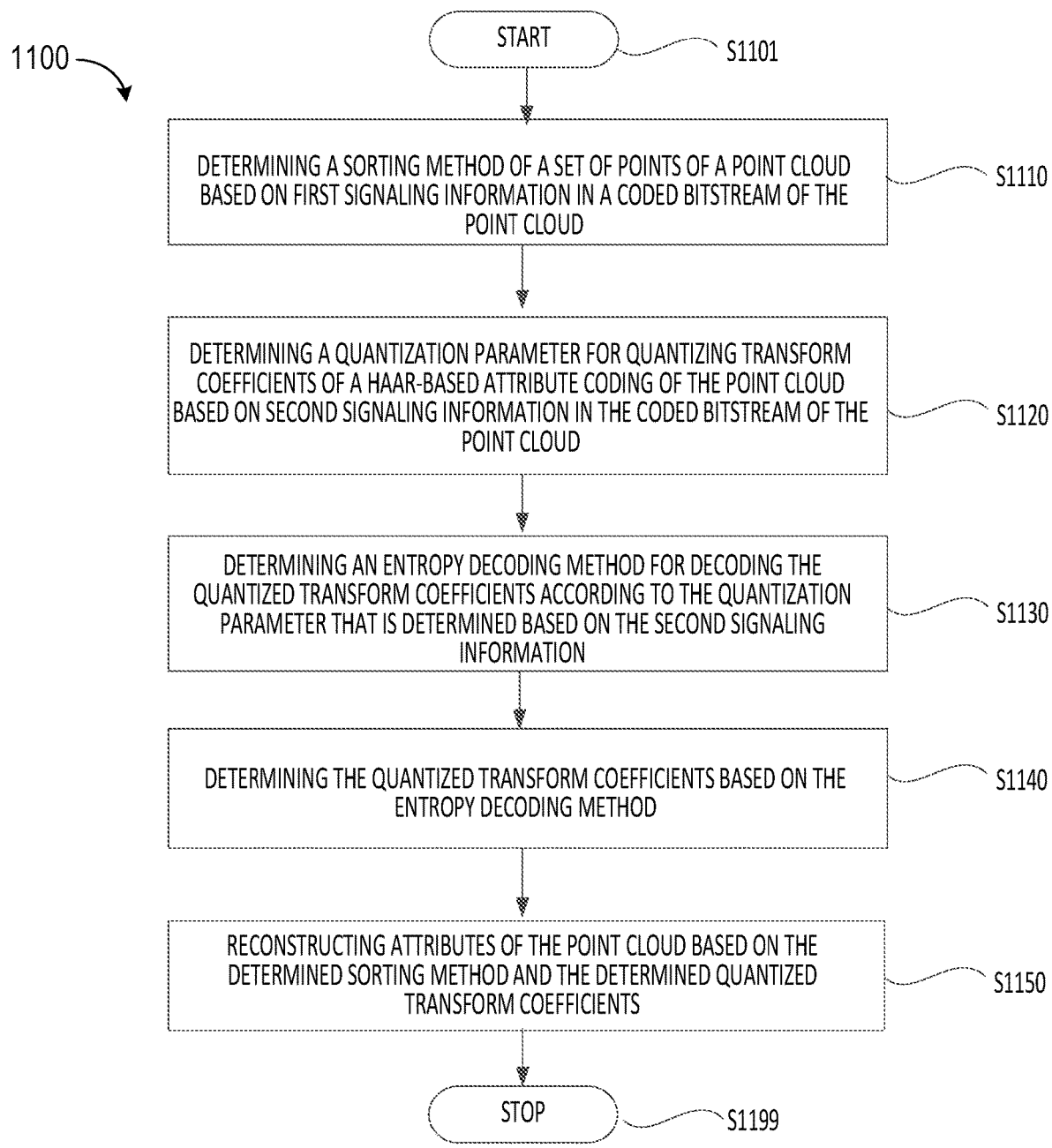
FIG. 11 shows a flow chart outlining an exemplary decoding process in accordance with some embodiments.

FIG. 11 shows a flow chart outlining a process (1100) according to embodiments of the disclosure. The processes (1100) can be used during decoding processes for point clouds. In various embodiments, the process (1100) can be executed by processing circuitry, such as the processing circuitry in the terminal devices (110), the processing circuitry that performs functions of the encoder (203) and/or the decoder (201), the processing circuitry that performs functions of the encoder (300), the decoder (400), the encoder (500), and/or the decoder (600), and the like. In some embodiments, the process (1100) can be implemented in software instructions, thus when the processing circuitry executes the software instructions, the processing circuitry performs the process (1100).

As shown in FIG. 11, the process (1100) starts at (S1101) and proceeds to (S1110).

At (S1110), a sorting method of a set of points of a point cloud can be determined based on first signaling information in a coded bitstream of the point cloud.

At (S1120), a quantization parameter for quantizing transform coefficients of a Haar-based attribute coding of the point cloud can be determined based on second signaling information in the coded bitstream of the point cloud.

At (S1130), an entropy decoding method for decoding the quantized transform coefficients can be determined according to the quantization parameter that is determined based on the second signaling information.

At (S1140), the quantized transform coefficients can be further determined based on the entropy decoding method.

At (S1150), attributes of the point cloud can be reconstructed based on the determined sorting method and the determined quantized transform coefficients.

In an example, the sorting method can be determined to be a Morton sorting based on the first signaling information being equal to a first value. In another example, the sorting method can be determined to be a Hilbert sorting based on the first signaling information being equal to a second value.

In some embodiments, the second signaling information can be set based on one of the quantization parameter, an application of the point cloud, and a characteristic of the point cloud.

In the process (1100), when the entropy decoding method is an exponential Golomb coding, an order k of the exponential Golomb coding can be determined based on third signaling information in the coded bitstream, where the third signaling information is indicative of the order k of the exponential Golomb coding.

In the process (1100), when the entropy decoding method is an exponential Golomb coding, an order k of the exponential Golomb coding can be determined based on the quantization parameter. Thus, the order k=max $$k = \max\left(0, \max\_k - \left\lfloor \frac{\text{trans\_coeff\_qp}}{s} \right\rfloor\right).$$

The max_k is a maximum order for the exponential Golomb coding for decoding the quantized transform coefficients, the trans_coeff_qp is a value of the quantization parameter, and the s is a positive integer that is equal to one of six and eight.

In some embodiments, in order to determine the quantized transform coefficients based on the entropy decoding method, absolute values of the quantized transform coefficients minus a threshold value can be decoded based on the exponential Golomb coding and the determined order k of the exponential Golomb coding. The threshold value can be equal to one of one, two, and three.

In some embodiments, in order to determine the quantized transform coefficients based on the entropy decoding method, a first quantized transform coefficient x of the quantized transform coefficients can be decoded. The first quantized transform coefficient x can be coded by the exponential Golomb coding such that a first part $$\left\lfloor \frac{x}{2^k} \right\rfloor$$

is coded using the exponential Golomb coding with the order k equal to zero, and a second part (x modulo $2^k$) is coded in a binary form.

In the process (1100), the set of points of the point cloud can be sorted based on the determined sorting method. The set of sorted points of the point cloud can further be partitioned into a plurality of segments based on a partition size indicated by partitioning signaling information in the coded bitstream. Each of the plurality of segments of the point cloud can be reconstructed based on the determined quantized transform coefficients.

In some embodiments, a number of the plurality of segments can be equal to [N/M], where the N can be a number of the set of points in the point cloud, and the M can be a positive integer.

In the process (1100), in order to reconstruct the point cloud, a scaling factor of ½ of a Haar transform matrix can be determined that is associated with the Haar-based attribute coding. An inverse quantization operation can be performed on the quantized transform coefficients to obtain transform coefficients based on the Haar-based attribute coding. An inverse transform operation can be performed on the point cloud based on the Haar transform matrix and the transform coefficients to obtain attribute residuals. The attributes of the point cloud can further be reconstructed based on the attribute residuals and predictive attributes of the point cloud obtained through the Haar-based attribute coding.

As noted above, techniques described above can be implemented as computer software using computer-readable instructions and physically stored in one or more computer-readable media. For example, FIG. 12 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
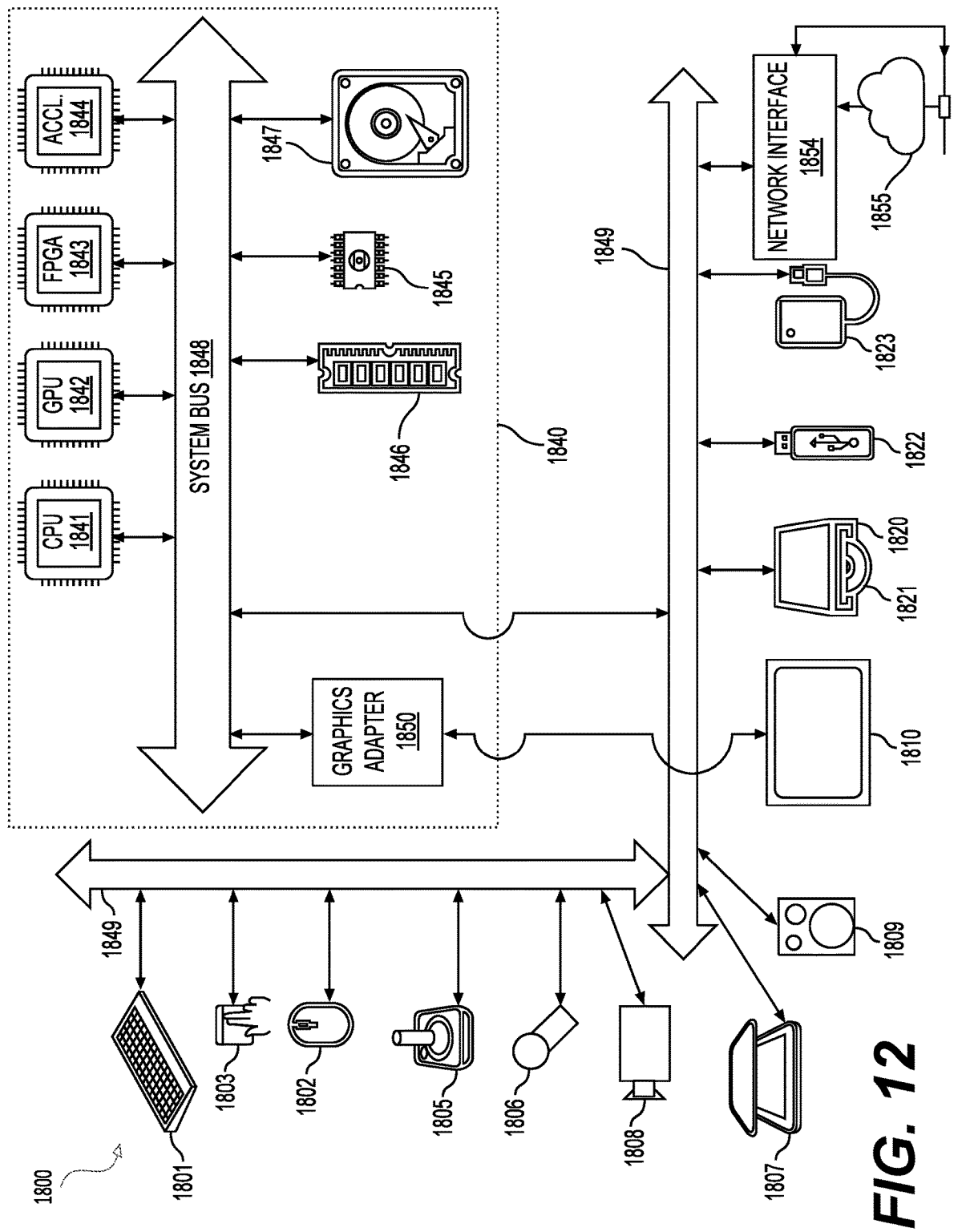
FIG. 12 is a schematic illustration of a computer system in accordance with an embodiment.

The components shown in FIG. 12 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can be also be stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition or as an alternative, the computer system can provide functionality as a result of logic hardwired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of point cloud attribute decoding in a point cloud decoder, comprising:
   determining a sorting method of a set of points of a point cloud;
   determining a quantization parameter for quantizing transform coefficients of a Haar-based attribute coding of the point cloud based on first signaling information in a coded bitstream of the point cloud, the Haar-based attribute coding being configured to perform point cloud compression on the set of points of the point cloud based on a forward Haar transform matrix;

determining an entropy decoding method for decoding quantized transform coefficients according to the quantization parameter that is determined based on the first signaling information;

determining (i) the quantized transform coefficients based on the entropy decoding method and (ii) transform coefficients by applying inverse quantization based on the quantization parameter;

applying an inverse transform operation to the transform coefficients using an inverse Haar transform matrix to generate attribute residuals, the inverse Haar transform matrix associated with decoding the point cloud being equal to a product of a factor of ½ and the forward Haar transform matrix associated with encoding the point cloud; and reconstructing attributes of the point cloud based on the determined sorting method and the generated attribute residuals.

2. The method of claim 1, wherein the determining the sorting method further comprises:

determining the sorting method of the set of points of the point cloud based on second signaling information in the coded bitstream of the point cloud, wherein:

the sorting method is a Morton sorting based on the second signaling information being equal to a first value; and the sorting method is a Hilbert sorting based on the second signaling information being equal to a second value.

3. The method of claim 1, wherein the first signaling information is set based on one of the quantization parameter, an application of the point cloud, and a characteristic of the point cloud, the application of the point cloud including one of (i) object detection and localization, (ii) mapping, and (iii) visualizing and archiving culture heritage objects, the characteristic of the point cloud including one of (i) geometry information, (ii) color, and (iii) reflectance.

4. The method of claim 1, wherein the determining the entropy decoding method further comprises:

based on the entropy decoding method being an exponential Golomb coding, determining an order k of the exponential Golomb coding based on third signaling information in the coded bitstream, the third signaling information being indicative of the order k of the exponential Golomb coding.

5. The method of claim 1, wherein the determining the entropy decoding method further comprises:

based on the entropy decoding method being an exponential Golomb coding, determining an order k of the exponential Golomb coding based on the quantization parameter, the order $$k = \max\left(0, \max\_k - \left\lfloor \frac{\text{trans\_coeff\_qp}}{s} \right\rfloor\right),$$

wherein the max_k is a maximum order for the exponential Golomb coding for decoding the quantized transform coefficients, the trans_coeff_qp is a value of the quantization parameter, and the s is a positive integer that is equal to one of six and eight.

6. The method of claim 4, wherein the determining the quantized transform coefficients further comprises:

decoding absolute values of the quantized transform coefficients minus a threshold value based on the exponential Golomb coding and the determined order k of the exponential Golomb coding, the threshold value being equal to one of one, two, and three.

7. The method of claim 4, wherein the determining the quantized transform coefficients further comprises:

decoding a first quantized transform coefficient x of the quantized transform coefficients, wherein the first quantized transform coefficient x is coded by the exponential Golomb coding such that a first part $$\left\lfloor \frac{x}{2^k} \right\rfloor$$

is coded using the exponential Golomb coding with the order equal to zero, and a second part (x modulo $2^k$) is coded in a binary form, k indicating the order of the exponential Golomb coding.

8. The method of claim 2, further comprising:

sorting the set of points of the point cloud based on the determined sorting method;

partitioning the set of sorted points of the point cloud into a plurality of segments based on a partition size indicated by partitioning signaling information in the coded bitstream; and reconstructing each of the plurality of segments of the point cloud based on the determined quantized transform coefficients.

9. The method of claim 8, wherein a number of the plurality of segments is equal to [N/M], the N being a number of the set of points in the point cloud, the M being a positive integer.

10. The method of claim 1, wherein the reconstructing further comprises:

reconstructing the attributes of the point cloud based on the generated attribute residuals and predictive attributes of the point cloud obtained through the Haar-based attribute coding.

11. An apparatus of processing point cloud data, comprising:

processing circuitry configured to:

determine a sorting method of a set of points of a point cloud;

determine a quantization parameter for quantizing transform coefficients of a Haar-based attribute coding of the point cloud based on first signaling information in a coded bitstream of the point cloud, the Haar-based attribute coding being configured to perform point cloud compression on the set of points of the point cloud based on a forward Haar transform;

determine an entropy decoding method for decoding the quantized transform coefficients according to the quantization parameter that is determined based on the first signaling information;

determine (i) the quantized transform coefficients based on the entropy decoding method and (ii) transform coefficients by applying inverse quantization based on the quantization parameter;

apply an inverse transform operation to the transform coefficients using an inverse Haar transform matrix to generate attribute residuals, the inverse Haar transform matrix associated with decoding the point cloud being equal to a product of a factor of ½ and the forward Haar transform matrix associated with encoding the point cloud; and reconstruct attributes of the point cloud based on the determined sorting method and the generated attribute residuals.

12. The apparatus of claim 11, wherein the processing circuitry is further configured to:
determine the sorting method of the set of points of the point cloud based on second signaling information in the coded bitstream of the point cloud, wherein:
the sorting method is a Morton sorting based on the second signaling information being equal to a first value; and
the sorting method is a Hilbert sorting based on the second signaling information being equal to a second value.

13. The apparatus of claim 11, wherein the first signaling information is determined based on one of the quantization parameter, an application of the point cloud, and a characteristic of the point cloud, the application of the point cloud including one of (i) object detection and localization, (ii) mapping, and (iii) visualizing and archiving culture heritage objects, the characteristic of the point cloud including one of (i) geometry information, (ii) color, and (iii) reflectance.

14. The apparatus of claim 11, wherein the processing circuitry is further configured to:
based on the entropy decoding method being an exponential Golomb coding,
determine an order k of the exponential Golomb coding based on third signaling information in the coded bitstream, the third signaling information being indicative of the order k of the exponential Golomb coding.

15. The apparatus of claim 11, wherein the processing circuitry is further configured to:
based on the entropy decoding method being an exponential Golomb coding,
determine an order k of the exponential Golomb coding based on the quantization parameter, the order $$k = \max\left(0, \max\_k - \left\lfloor \frac{\text{trans\_coeff\_qp}}{s} \right\rfloor\right),$$

wherein the max k is a maximum order for the exponential Golomb coding for decoding the quantized transform coefficients, the trans_coeff_qp is a value of the quantization parameter, and the s is a positive integer that is equal to one of six and eight.

16. The apparatus of claim 14, wherein the processing circuitry is further configured to:
decode absolute values of the quantized transform coefficients minus a threshold value based on the exponential Golomb coding and the determined order k of the exponential Golomb coding, the threshold value being equal to one of one, two, and three.

17. The apparatus of claim 14, wherein the processing circuitry is further configured to:
decode a first quantized transform coefficient x of the quantized transform coefficients, wherein the first quantized transform coefficient x is coded by the exponential Golomb coding such that a first part $$\left\lfloor \frac{x}{2^k} \right\rfloor$$

is coded using the exponential Golomb coding with the order equal to zero, and a second part (x modulo $2^k$) is coded in a binary form, k indicating the order of the exponential Golomb coding.

18. The apparatus of claim 12, wherein the processing circuitry is further configured to:
sort the set of points of the point cloud based on the determined sorting method;
partition the set of sorted points of the point cloud into a plurality of segments based on a partition size indicated by partitioning signaling information in the coded bitstream; and
reconstruct each of the plurality of segments of the point cloud based on the determined quantized transform coefficients.

19. The apparatus of claim 18, wherein a number of the plurality of segments is equal to [N/M], the N being a number of the set of points in the point cloud, the M being a positive integer.

20. The apparatus of claim 11, wherein the processing circuitry is further configured to:
reconstruct the attributes of the point cloud based on the generated attribute residuals and predictive attributes of the point cloud obtained through the Haar-based attribute coding.

* * * * *